Feb. 12, 1957   A. C. O. LIBAULT   2,780,957
MEANS FOR PRINTING LEGENDS ON GEOGRAPHICAL MAPS
Filed Feb. 26, 1954   3 Sheets-Sheet 2

INVENTOR
André LIBAULT
By
Mead, Browne, Schuyler & Beveridge
ATTORNEYS

INVENTOR
André LIBAULT
ATTORNEYS

2,780,957

MEANS FOR PRINTING LEGENDS ON GEOGRAPHICAL MAPS

André Charles Octave Libault, Paris, France

Application February 26, 1954, Serial No. 412,905

9 Claims. (Cl. 88—24)

The present application is a continuation in part of my co-pending specification Ser. No. 11,154, filed on February 26, 1948, now abandoned, and entitled "Method and Means for Printing Inscriptions on Geographical Maps and the Like."

My invention is important by reason of its allowing bodily recording in a very rapid manner the legends to be transferred onto the master map from which corresponding maps are to be printed. Hitherto such legends were transferred one by one onto the master map by direct engraving or lithographing thereof at corresponding locations, which method required a long and tedious series of operations which can be executed only by skilled and experienced draftsmen. Even with the application of photomechanical methods, no satisfactory results have been obtained, since it has merely been proposed to prepare different strips for the different legends and to affix them on the required points of the original drawing with a view to obtaining by photographing the composite original map, the desired master map.

Now, according to my invention, I prepare the different legends on a film in any desired sequential relationship and I cause each legend to be projected on a sketch map forming the lay-out sheet and then shifted over the latter until the observer finds that the legend actually registers with its desired location on the sketch map; this being done, a beam produced for instance by deflecting the beam projecting the legend on the sketch map is caused by any conventional means to print the legend considered onto a location of a sensitized sheet corresponding to the location referred to on the sketch map; the sheet, after impression thereon of the different legends is developed so as to form a sheet carrying in the desired relative positions as well longitudinally, transversely and angularly the different legends which are to be transferred onto the master map. It is then an easy matter to transfer bodily all the legends onto the master map in a skeleton state, i. e. carrying no legend. This is readily accomplished through any conventional photographic method after laying the legend sheet obtained as indicated over the skeleton map, care being taken of course to make the legends on the sheet register with the desired locations on the skeleton map, which registration is obtained immediately since the legend sheet has been prepared for this purpose.

It should be remarked that the method disclosed has been designed exclusively for the printing of legends which are distributed over geographical maps in a highly undefined manner. This means that the images of the successive legends must be brought selectively into register with their locations on the sketch map and this cannot be obtained automatically, but only through reference to particular points of said sketch map; although this is an easy matter with my improved arrangement for any one skilled in the art, this procedure is wholly different from apparently similar procedures proposed hitherto for printing in correct juxtaposition the different letters of a printed line which succeed one another in regular sequence, the different lines being also printed in succession in regularly spaced relationship.

My invention also covers the arrangement for executing said method, which arrangement includes means for shifting simultaneously over the stationary surface over which the sketch map and the skeleton map are secured, the projector for the legend-carrying film and the camera adapted to print the film legends on the sensitive sheet while optical or mechanical means are provided for angularly shifting when required the images of the legends both for projection onto the sketch map and for printing on the skeleton map.

I have illustrated by way of example in accompanying drawings a preferred embodiment of my invention, incorporating a single projector for projection on the sketch map and for printing on the sheet, although obviously separate illumination means may be used for these two purposes, provided the projection and printing axes remain always in the same relationship throughout operation and the two similar films which are then required respectively for the actual projector and for the camera move in exact synchronism.

Figure 1:
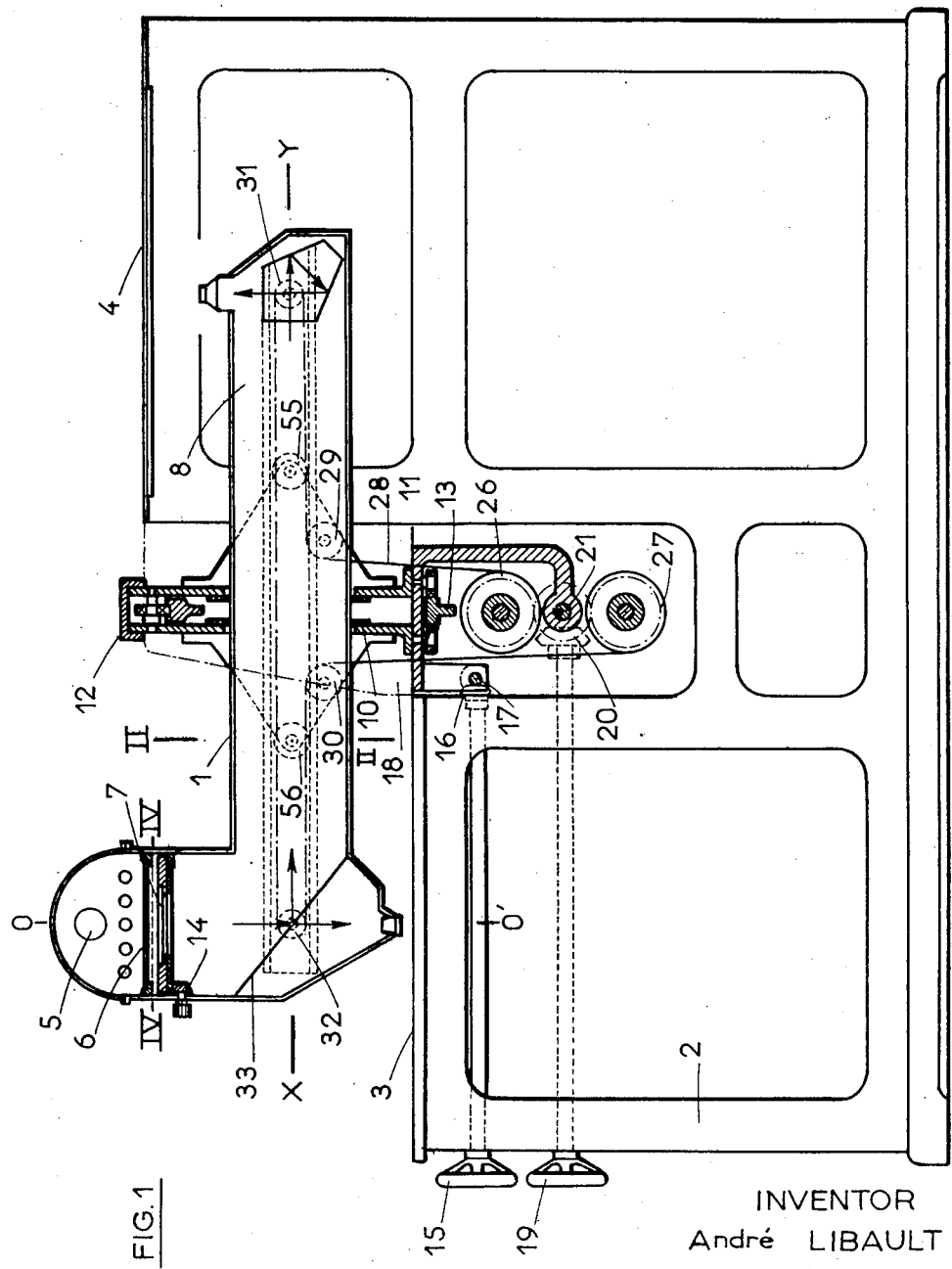
Fig. 1 is a longitudinal diagrammatic cross section of my improved apparatus including a projecting and printing unit.
Figure 2:
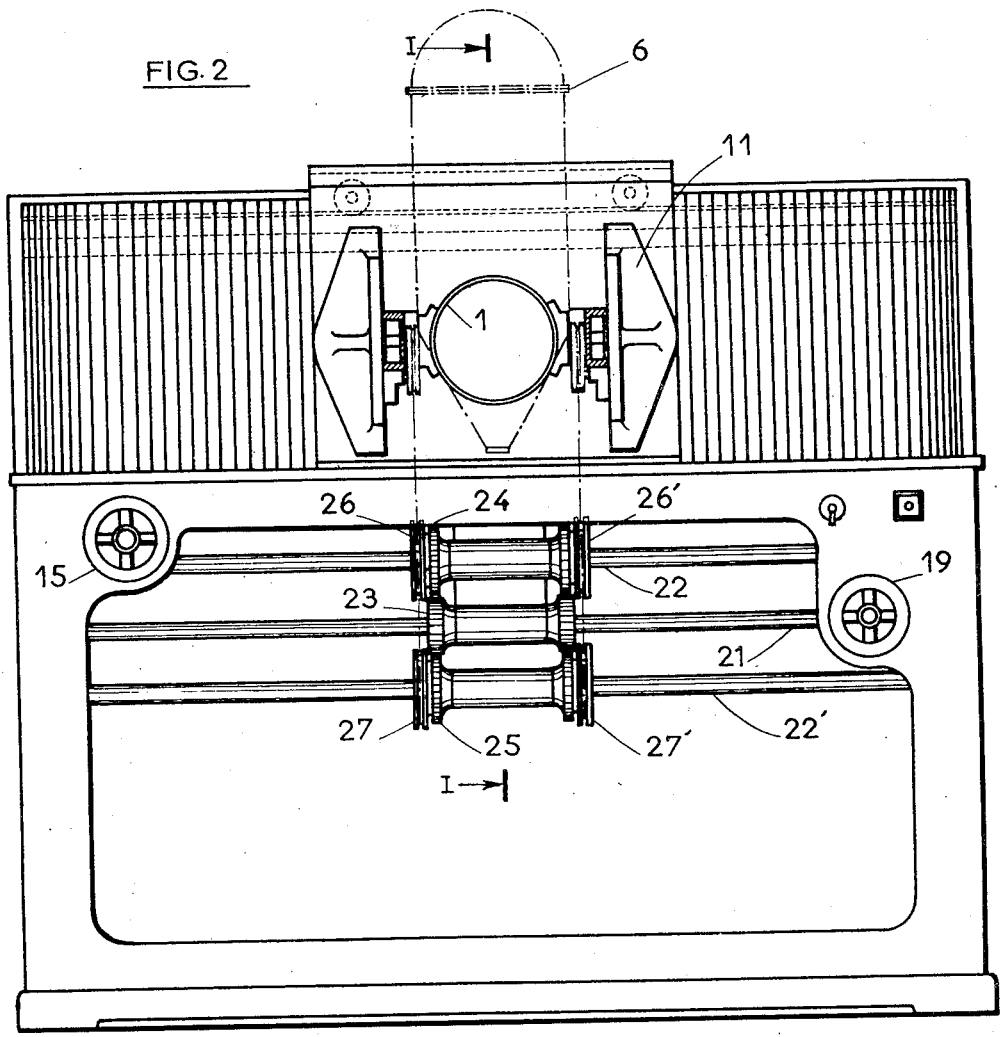
Fig. 2 is a cross-sectional view of the same apparatus as seen in the direction of the arrows II—II of Fig. 1.

Turning to Fig. 1, I provide a compound projector and camera unit 1 adapted to slide transversely and longitudinally over the large stationary bed 2 carrying the sketch map at 3 and a sensitized sheet at 4. As already mentioned, it is essential to obtain a perfectly constant correspondency between surfaces 3 and 4 and this requires in practice both surfaces to remain secured to a stationary support such as the bed 2. The unit 1 includes a projector 5 adapted to project a picture of the film 6 unwinding over the gate 7 onto the sketch map 3, said projector having its optic axis $OO^1$ arranged vertically. A portion of the projecting beam, or in fact all of it, if required, may be shifted by the semi-reflecting surface 33, or a shiftable reflecting surface, along the horizontal axis XY so as to enter the camera section 8 of the unit 1 and to impinge, inside a camera obscura which need not be described or illustrated, onto the sensitized sheet 4 after further reflection on a prism or mirror which provides two successive reflections so as to obtain a picture the direction of which is the same as that of the original, said prism or mirror being shown at 9. The unit 1 slides longitudinally inside the bearings 10 which may be of any known or suitable type; these bearings are fast with a support 11 adapted to travel over the bed 2 in a horizontal direction perpendicularly to the above referred-to longitudinal axis XY of the unit 1, along which the beam passing out of the projector 5 enters the camera 8. Suitable stationary guiding means are provided at 12 and 13 at the upper and lower ends of the support 11 to allow the latter to move horizontally over the bed 2, perpendicularly to said axis XY.

The control of the rotary movement of the film round the axis $OO^1$ underneath the projector 5 is obtained easily by means of the hand-actuated bevel gear 14 as will be explained with further detail hereinafter.

The travel of the support or carriage 11 over the bed 2 is obtained by means of a handwheel 15 controlling a pinion 16 meshing with a worm or master screw 17 carried horizontally between two vertical ribs 18 rigid with the carriage 11.

A further handwheel 19 located next to the handwheel 15 controls through a bevel gear 20 an intermediate shaft 21 driving two parallel shafts 22 and 22', as provided by the interengaging gears 23—24 and 23—25. The shafts 22 and 22' carry each two pulleys 26, 26' and 27, 27', the associated pulleys 26 and 26' and 27 and 27' controlling respectively the ends of twin cables 28 so as to draw in selectively one of said ends, as readily apparent from inspection of Fig. 1.

The cables 28 are wound in succession over the pulleys 29 and 30 revolubly carried by the support or carriage 11. The cables pass, between the pulleys 29 and 30, over the pulleys 31 and 32 revolubly carried by the unit 1. It is apparent that, by reason of the opposite directions of winding of the two strands of the cable, the rotation of the handwheel 19 will wind in, according to its direction of rotation, either of the strands so as to make either the right hand strand wound in over the pulleys 26 and 26' act on the twin pulleys 31, shift the latter and consequently the unit 1 towards the left, or the other strand, wound in by the pulleys 27 and 27', act on the left hand pulleys 32 so as to shift the unit towards the right. Guiding rollers 55 and 56 are provided on the unit for engagement with horizontal slideways extending longitudinally to either side of the carriage 11.

It is readily apparent that the operator has merely to shift the unit 1 transversely and longitudinally through operation of the handwheels 15 and 19 in order to bring the axis OO¹ of the projector 5 into register with any desired location of the sketch map 3 and to make thus the image of the legend carried by the film 6 in register with the axis focus on or in the vicinity of a city, river, mountain or the like place of interest drawn on said sketch. At the same time the operator may rock the film and consequently the legend thereon round the axis OO¹ into any desired angular position corresponding to the desired obliquity of the legend as it is to be printed on the map.

This being done, it is sufficient to open the shutter of the camera section 8, which shutter is not illustrated in Fig. 1, and part of the light beam will be reflected by the semi-transparent mirror 33 facing the projector through the camera and onto a point of the sensitized sheet 4, the location of which point is in exact correspondency with the location of the image projected on the sketch map 3. The procedure is continued for at least part of the legends of the map and the sheet 4 may then be developed and shall form the auxiliary legend-carrying sheet adapted to be printed on the skeleton map so as to form the finished master map carrying both the lines and the legends associated therewith.

Figure 3:
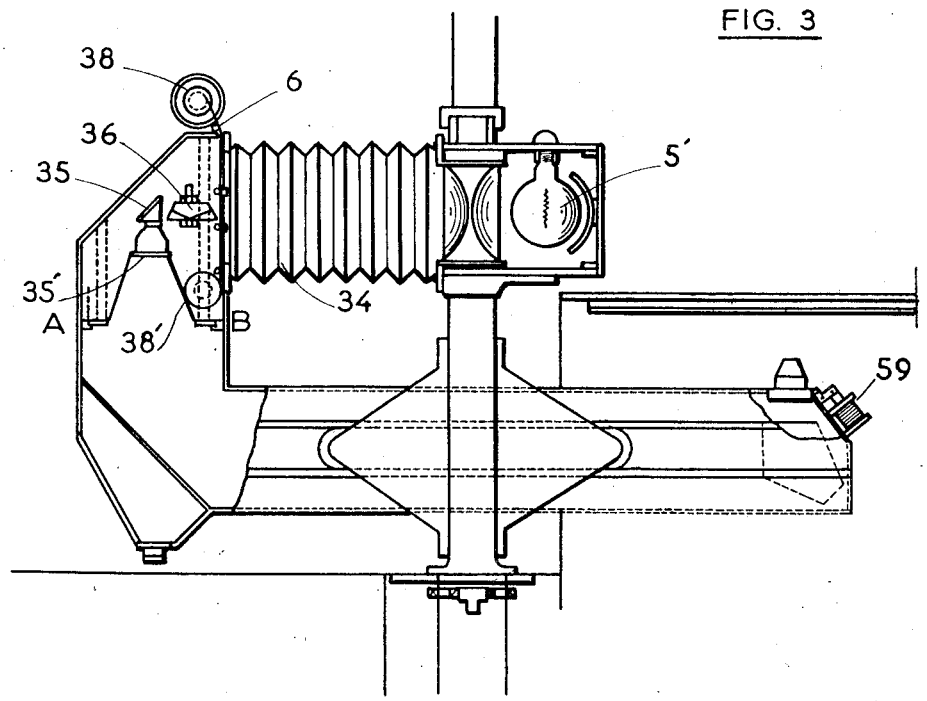
Fig. 3 is an elevational partly sectional view of a modification of the projector system of Fig. 1.

In the modification of Fig. 3, the projector is modified in so far that it is rigid with the carriage 11 so as to improve the balance of the unit 1. In this case, the projector lamp 5' rigid with the carriage in vertical register with the medial transverse plane thereof produces a light beam which travels through the horizontal bellows 34 onto a reflecting surface 35 extending across the axis of the projector and at 45° with reference thereto; the remainder of the projector may be similar to that illustrated in Fig. 1.

Modifications in the size of the legends are rendered possible by the variable lenses 35' adapted to produce enlarged or reduced images of the film legends, by focusing said film images on the horizontal plane A—B in a manner well known in the art. The virtual images thus formed at A—B act exactly in the same manner as the actual pictures on the film 6 in Fig. 1.

It may also be of interest, in this case, as also in the case of the arrangement of Fig. 1, to provide for the optical shifting of the legend image both on the sketch map and on the sheet 4 by inserting a Wollaston prism in the part of the beam produced by the projector just beyond the legend-carrying film. Thus, in the case of Fig. 3, the legend-carrying film 6 is unwound across the horizontal beam produced by the projector 5' in a vertical plane extending between the outer end of the bellows and the projector axis extending beyond same. Between the film 6 and the reflecting surface 35 crossing at 45° the horizontal axis of projection and the vertical axis of the projector, there is inserted a Wollaston prism 36 the angular position of which is adjusted as required to obtain the desired obliquity of the image of the legend.

In a further embodiment, which is not illustrated, two similar legend-carrying films are provided one of which is shifted by the operator through the projection gate while the other follows the movement of the first film synchronously inside the camera which is arranged symmetrically of the projector 5 with reference to the vertical plane passing transversely through the centre of the unit 1.

In this case, the camera includes its own projector and the printing of the second film is performed in the same conditions of correlation between the image formed thereby and the image formed on the sketch map 3 as in the preceding case.

According to a further modification, the sensitized sheet 4 may be laid underneath the unit 1 instead of above same as in the case of Fig. 1. This provides a final legend-carrying sheet which is the image in a mirror of that which is obtained in the case of Fig. 1. Either of the two arrangements described is resorted to according as to whether the film is to be used subsequently in an offset machine or in a flat bed litho printing machine.

Figure 4:
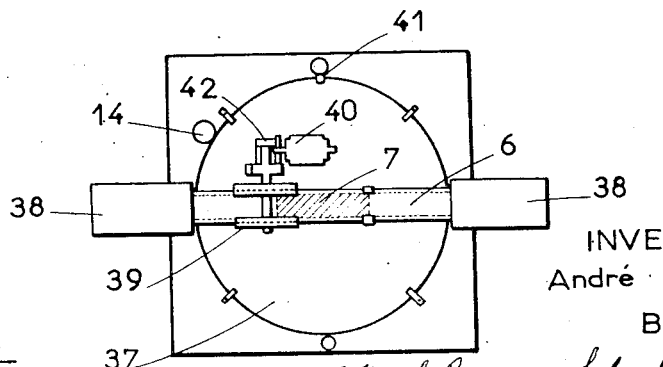
Fig. 4 is a diagrammatic cross-section through line IV—IV of Fig. 1 showing the rotary carrier for the legend-carrying film.
Figure 5:
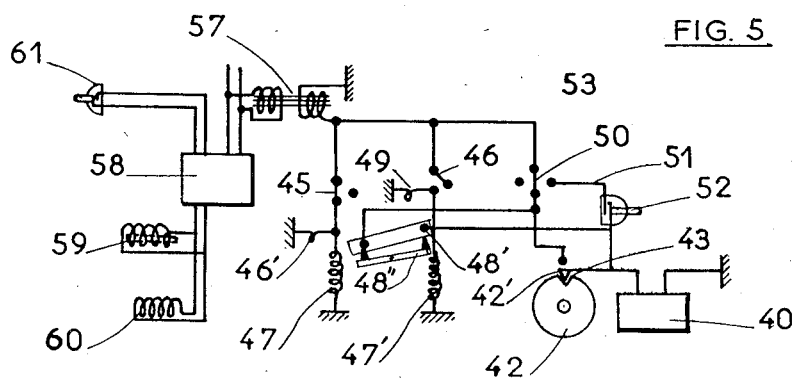
Fig. 5 is a wiring diagram controlled by the camera shutter, which latter is shown separate in Fig. 6.

I will now disclose the arrangement illustrated in Figs. 4 and 5. Fig. 4 shows the film 6 carried by a revoluble carrier plate 37 adapted to revolve round the axis of the projector 5. The film 6 winds off a feed reel 38 onto a take-up reel 38' so that the successive legends may be projected through the illuminated gate 7 ahead of the film-driving sprocket wheels 39. The two reels and the sprocket wheels are carried by the plate 37. The sprocket wheels are driven by an electric motor 40 through the agency of a speed reducer while the disc 37 is angularly adjusted by means of the above referred-to bevel gear 14. A stationary reference mark for the angular shifting of the disc is provided at 41.

In Fig. 5, the push-button 61 operates an exposure-meter or light-integrator 58, controlling the shutter-controlling electro-magnet 59 and the brake 60. The latter, which is of any known type, prevents any movement of the unit 1 during the exposure provided by the opening of the shutter. A secondary circuit feeds, through the transformer 57, the control means provided for the progression of the film as described hereinafter.

Figure 6:
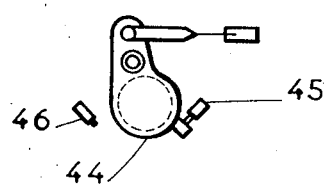

The motor 40 is controlled by a switch 42 operating once for each revolution of the sprocket-wheel 39, as apparent from inspection of Fig. 5. In said figure, the switch 42 controlling the motor 40 is constituted by a disc provided with a notch at 43. The shutter 44, shown separate in Fig. 6 between the abutments 45 and 46 defining its operative and its inoperative position, closes, when engaging the abutment 45 corresponding to its closed inoperative position, a corresponding switch which energizes a tell-tale bulb 46' and a winding 47 which causes the contact-piece 48'' to close the circuit of the motor 40, through the contact-piece 48', in series with the contact-piece 48'''. The motor 40 then starts and closes the switch 42 by making a contact-piece 42' move out of a notch 43 onto the raised section of the periphery of the switch member 42. At the same time, the contact piece 48' opens the circuit of the motor that is now controlled only by the switch 43. This causes the legend-carrying film to progress through a distance corresponding to one revolution of the sprocket-wheel and consequently in principle to the spacing between two successive legends on the film. The switch 42 opens again. The subsequent opening of the shutter as required for printing the next legend when its position is adjusted closes the circuit of the winding 47' and illuminates the second tell-tale lamp 49. This makes the contact-piece 48' close the circuit, but only a very short time after the contact-piece 48" has been opened again, so that the motor does not start, but is ready for the next starting.

It should be remarked that a switch 50 is adapted to provide selectively automatic operation of the motor in the position illustrated and controlled operation by closing the shunt 51 controlled by the push button 52 and finally the third position on the stationary contact piece 53 prevents any operation at all of the motor 40, as required in particular cases where the film is to remain stationary while the same symbol is to be repeated a large number of times.

What I claim is:

1. An arrangement for producing a legend-carrying sheet, the legends on which are to be transferred bodily onto a master skeleton map in the accurate relative locations and angular settings desired, said arrangement comprising a stationary carrier for a photo-sensitive surface and a sketch map, a carriage adapted to move transversely over the stationary support, hand-operable means controlling said transverse movement of the carriage, a unit adapted to move longitudinally with reference to said carriage, said unit including a projector adapted to project a beam of light onto a point of the sketch map defined by the position of the carriage and of the unit at the moment considered, a film carrying in uniform spaced relationship the legends to be transferred onto the skeleton map, a gated plate adapted to revolve round the axis of the projector beam inside the unit, film-unwinding means carried by said plate, hand-operable means controlling the angular setting of the plate to modify the angular setting of the image on the sketch map, a motor driving the film stepwise over the gate, a motor-feeding circuit, a switch controlling said circuit and controlled by the motor to switch said motor off after each progression of the film by one interval corresponding to the spacing between two successive legends, hand-operable means controlling said longitudinal movement of the unit, a camera incorporated into and rigid with the unit and adapted to project a beam of light onto a point of the sensitive sheet, the location of which corresponds both transversely and longitudinally with the location of the impact point of the projector beam on the sketch map at the same moment, means whereby at least part of the beam passing through the film legend is deflected into the camera to project on the corresponding point of the sensitive sheet an image of the legend the location of which has been checked on the reference sketch map.

2. An arrangement for producing a legend-carrying sheet, the legends on which are to be transferred bodily onto a master skeleton map in the accurate relative locations and angular settings desired, said arrangement comprising a stationary carrier for a photo-sensitive surface and a sketch map, a carriage adapted to move transversely over the stationary support, hand-operable means controlling said transverse movement of the carriage, a unit adapted to move longitudinally with reference to said carriage, said unit including a projector adapted to project a beam of light onto a point of the sketch map defined by the position of the carriage and of the unit at the moment considered, a film carrying in uniform spaced relationship the legends to be transferred onto the skeleton map, a gated plate adapted to revolve round the axis of the projector beam inside the unit, film-unwinding means carried by said plate, hand-operable means controlling the angular setting of the plate to modify the angular setting of the image on the sketch map, a motor driving the film stepwise over the gate, a motor-feeding circuit, a switch controlling said circuit and controlled by the motor to switch said motor off after each progression of the film by one interval corresponding to the spacing between two successive legends, hand-operable means controlling said longitudinal movement of the unit, a camera incorporated into and rigid with the unit and adapted to project a beam of light onto a point of the sensitive sheet, the location of which corresponds both transversely and longitudinally with the location of the impact point of the projector beam on the sketch map at the same moment, means whereby at least part of the beam passing through the film legend is deflected into the camera to project on the corresponding point of the sensitive sheet an image of the legend the location of which has been checked on the reference sketch map, a shutter for the camera, a shunt across the switch in the motor-driving circuit, a hand-operable switch in the shunt, a master switch adapted to provide according to its position permanent opening of the motor circuit, insertion of the shunt in the circuit and automatic means whereby the closing of the shutter after printing of a legend image closes the circuit to energize the motor and make the film progress by one legend interval.

3. An arrangement for producing a legend-carrying sheet, the legends on which are to be transferred bodily on a master skeleton map in the accurate relative locations and angular settings desired, said arrangement comprising a stationary carrier for a photo-sensitive sheet and a sketch map, a carriage adapted to move transversely over the stationary support, hand-operable means controlling said transverse movement of the carriage, a unit adapted to move longitudinally with reference to said carriage, said unit including a projector adapted to project a beam of light onto a point of the sketch map defined by the position of the carriage and of the unit at the moment considered, a film carrying in uniform spaced relationship the legends to be transferred onto the skeleton map, a gated plate adapted to revolve round the axis of the projector beam inside the unit, film-unwinding means carried by said plate, hand-operable means controlling the angular setting of the plate to modify the angular setting of the image on the sketch map, a motor driving the film setpwise over the gate, a motor-feeding circuit, a switch controlling said circuit and controlled by the motor to switch said motor off after each progression of the film by one interval corresponding to the spacing between two successive legends, hand-operable means controlling said longitudinal movement of the unit, a camera incorporated into and rigid with the unit and adapted to project a beam of light onto a point of the sensitive sheet, the location of which corresponds both transversely and longitudinally with the location of the impact point of the projector beam on the sketch map at the same moment, a shutter in the camera, a brake adapted to cooperate with the unit and with the carriage, means for simultaneously opening the shutter and making the brake operative, means whereby at least part of the beam passing through the film legend is deflected into the camera to project on the corresponding point of the sensitive sheet an image of the legend the location of which has been checked on the reference sketch map.

4. An arrangement for producing a legend-carrying sheet, the legends on which are to be transferred bodily on a master skeleton map in the accurate relative locations and angular settings desired, said arrangement comprising a stationary carrier for a photo-sensitive sheet and a sketch map, a carriage adapted to move transversely over the stationary support, hand-operable means controlling said transverse movement of the carriage, a unit adapted to move longitudinally with reference to said carriage, said unit including a projector adapted to project a beam of light onto a point of the sketch map defined by the position of the carriage and of the unit at the moment considered, a film carrying the legends to be transferred onto the skeleton map, a gated plate adapted to revolve round the axis of the projector beam inside the unit, film-unwinding means carried by said plate, hand-operable means controlling the angular setting of the plate to modify the angular setting of the image on the sketch map, a motor driving the film over the gate, a motor-feeding circuit, means controlling said circuit to switch off the motor after each progression of the film by the spacing between one legend and the next one, hand-operable means controlling said longitudinal movement of the unit, a camera incorporated into and rigid with the unit and adapted to project a beam of light onto a point of the sensitive sheet, the location of which corresponds both transversely and longitudinally with the location of the impact point of the projector beam on the sketch map at the same moment, a shutter in the camera, a brake adapted to cooperate with the unit and with the carriage, means for simultaneously opening the shutter and making the brake operative, means whereby at least part of the beam passing through the film legend is deflected into the camera to project on the corresponding point of the sensitive sheet an image of the legend the location of which has been checked on the reference sketch map.

5. An arrangement for producing a legend-carrying sheet, the legends on which are to be transferred bodily on to a master skeleton map in the accurate relative locations and angular settings desired, said arrangement comprising a carrier, a photo-sensitive surface and a sketch map, each of which surface and map is mounted on said carrier in a plane parallel with a geometrical plane defined in said carrier, a second carrier, adapted to be shifted with reference to the first carrier in two directions extending perpendicularly to each other inside said geometrical plane, a projector carried by the second carrier and adapted to project a beam of light onto a point of the sketch map defined by the relative position of the two carriers at the moment considered, a film carrying in uniform spaced relationship the legends to be transferred onto the skeleton map, a gated plate adapted to revolve round the axis of the projector beam inside the projector, means carried by said gated plate, and adapted to make said film unwind across the gate in the plate and thereby to make the projector form images of the legends on the film on the sketch map, hand-operable means controlling the angular setting of the plate to modify the angular setting of the image on the sketch map of the legend of the film registering with the gate in the plate, a motor driving the film unwinding means, a motor-feeding circuit, a switch controlling said circuit and controlled by the motor to switch said motor off each time the film has progressed by an interval between two successive legends, hand-operable means controlling the relative movements of the carriers in the two above mentioned perpendicular directions, a camera carried by the second carrier and including a shutter and adapted to project a beam of light onto a point of the sensitive sheet, the location of which corresponds for both directions of shifting with the location of the impact point of the projector beam on the sketch map at the same moment, means whereby at least part of the beam passing through the film legend in the gate is deflected into the camera to be projected on the corresponding point of the sensitive sheet and to form thereon an image of the legend the location of which has been observed on the sketch map, a shunt across the switch in the motor circuit, a hand-operable switch in the shunt, a master switch adapted to provide according to its position permanent opening of the motor circuit, insertion of the shunt in the circuit and closing of the circuit with a cutting out of the shunt and means whereby the closing of the shutter after the printing of a legend image closes automatically the first switch in the circuit to energize the motor and make the film progress by one legend interval.

6. An arrangement for producing a legend-carrying sheet, the legends on which are to be transferred bodily onto a master skeleton map in the accurate relative locations and angular settings desired, said arrangement comprising a carrier, a photo-sensitive surface and a sketch map, each of which surface and map is mounted on said carrier in a plane parallel with a geometrical plane defined in said carrier, a second carrier, adapted to be shifted with reference to the first one in directions extending perpendicularly to each other inside said geometrical plane, a projector carried by the second carrier and adapted to project a beam of light onto a point of the sketch map defined by the relative position of the two carriers at the moment considered, a film carrying the legends to be transferred onto the skeleton map, a gated plate adapted to revolve round the axis of the projector beam inside the projector, means carried by said gated plate and adapted to make said film unwind across the gate in the plate and thereby to make the projector form images of the legends on the film on the sketch map, hand-operable means controlling the angular setting of the plate to modify the angular setting of the image on the sketch map of the legend of the film registering with the gate in the plate, a motor driving the film unwinding means, a motor-feeding circuit, means adapted to switch the motor off each time the film has progressed by an amount such as has brought a further legend into register with the gate in the plate, hand-operable means controlling the relative movements of the carriers in the two above mentioned perpendicular directions, a camera carried by the second carrier and including means adapted to project a beam of light onto a point of the sensitive sheet, the location of which corresponds for both directions of movement with the location of the impact point of the projector beam on the sketch map at the same moment, means whereby at least part of the beam passing through the film legend in the gate is deflected into the camera to be projected on the corresponding point of the sensitive sheet and to form thereon an image of the legend the location of which has been observed on the sketch map, a shutter in the camera, a brake adapted to cooperate with the two carriers, and means for simultaneously opening the shutter and making the brake operatively hold the carriers fast with reference to each other.

7. An arrangement for producing a legend-carrying sheet, the legends on which are to be transferred bodily onto a master skeleton map in the accurate relative locations and angular settings desired, said arrangement comprising a carrier, a photo-sensitive surface and a sketch map, each of which surface and map is mounted on said carrier in a plane parallel with a geometrical plane defined in said carrier, a second carrier, means for shifting the carriers with reference to each other in two directions extending perpendicularly to each other inside said geometrical plane, a projector carried by the second carrier and adapted to project a beam of light onto a point of the sketch map defined by the relative position of the two carriers at the moment considered, a film carrying the legends to be transferred onto the skeleton map, a gated plate adapted to revolve round the axis of the projector beam inside the projector, means carried by said gated plate and adapted to make the said film unwind across the gate in the plate and thereby to make the projector form images of the legends on the film on the sketch map, a Wollaston prism extending across the path of the beam of light produced by the projector in a location just beyond the film, means for angularly shifting the Wollaston prism round the axis of the beam passing through it to modify the angular setting of the image on the sketch map, a motor driving the film-unwinding means, a motor-feeding circuit, means adapted to switch the motor off each time the film has progressed by an amount such as has brought a further legend into register with the gate in the plate, a camera carried by the second carrier and including means adapted to project a beam of light onto a point of the sensitive sheet, the location of which corresponds for both directions of shifting with the location of the impact point of the projector beam on the sketch map at the same moment, and means whereby at least part of the projector beam passing through the film legend in the gate is deflected into the camera to form the beam to be projected by the latter onto the corresponding point of the sensitive sheet and to focus thereon an image of the legend, the location of which has been observed on the sketch map.

8. An arrangement for producing a legend-carrying sheet, the legends on which are to be transferred bodily onto a master skeleton map in the accurate relative locations and angular settings desired, said arrangement comprising a carrier, a photo-sensitive surface and a sketch map, each of which surface and map is mounted on said carrier in a plane parallel with a stationary geometrical plane, a second carrier, means for shifting the second carrier transversely of the first carrier in a direction parallel with said geometrical plane, a projector including a lamp casing rigid with the second carrier, a lamp therein, a rigid hollow casing adapted to move over the first carrier in a direction parallel with said geometrical plane and perpendicular to last mentioned direction, hand operable means for shifting said hollow casing over the second carrier, bellows connecting the lamp casing with one end of the hollow casing, and an optic system facing the outlet of the bellows inside said end of the hollow casing and adapted to transmit the beam projected by the lamp into the casing onto a point of the sketch map defined by the relative position of the hollow casing with reference to the first carrier, a film carrying the legends to be transferred onto the skeleton map, a gated plate adapted to revolve round the axis of the projector beam inside the projector, means carried by said gated plate and adapted to make said film unwind across the gate in the plate and thereby to make the projector form images of the legends on the film on the sketch map, hand operable means adapted to modify the angular setting of the image on the sketch map of the legend of the film registering with the gate in the plate, a motor driving the film unwinding means, a motor-feeding circuit, means adapted to switch the motor off each time the film has progressed by an amount such as has brought a further legend into register with the gate in the plate, a camera carried by the second carrier and including means adapted to project a beam of light onto a point of the sensitive sheet, the location of which corresponds for both directions of shifting with the location of the impact point of the projector beam on the sketch map at the same moment and means whereby at least part of the projector beam passing through the film legend in the gate is deflected into the camera to form the beam to be projected by the latter onto the corresponding point of the sensitive sheet and to form thereon an image of the legend the location of which has been observed on the sketch map.

9. An arrangement for producing a legend-carrying sheet, the legends on which are to be transferred bodily on to a master skeleton map in the accurate relative locations and angular settings desired, said arrangement comprising a carrier, a photo-sensitive surface and a sketch map, each of which surface and map is mounted on said carrier in a plane parallel with a geometrical plane associated with said carrier, a second carrier, means for shifting the carriers with reference to each other in two directions extending perpendicularly to each other in said geometrical plane, a projector carried by the second carrier and adapted to project a beam of light onto a point of the sketch map defined by the relative position of the two carriers at the moment considered, a film carrying the legends to be transferred onto the skeleton map, a gated plate adapted to revolve round the axis of the projector beam inside the projector, means carried by said gated plate and adapted to make said film unwind across the gate in the plate and thereby to make the projector focus images of the legends on the film on the sketch map, a motor driving the film-unwinding means, a motor-feeding circuit, means adapted to switch the motor off each time the film has progressed by an amount such as has brought a further legend into register with the gate in the plate, a camera carried by the second carrier and including an illuminating lamp and associated optic means adapted to project a second, independent beam of light onto a point of the sensitive sheet, the location of which corresponds for both directions of the relative shifting of the two carriers with the location of the impact point of the projector beam on the sketch map at the same moment, a second legend-carrying film optically identical with that passing through the projector, means for unwinding said second film across the said second beam formed in the camera synchronously with the unwinding of the first film, means for angularly shifting the two films in synchronism with reference to the axes of the corresponding beams, and means for controlling the operation of the camera after a checking of the location of the image of a legend as formed by the projector on the sketch map.

References Cited in the file of this patent

UNITED STATES PATENTS

| | | |
|---|---|---|
| 1,980,287 | Ogden | Nov. 13, 1934 |
| 1,986,693 | Uher | Jan. 1, 1935 |

FOREIGN PATENTS

| | | |
|---|---|---|
| 398,469 | Great Britain | Dec. 5, 1931 |